United States Patent
Thörn

(10) Patent No.: US 10,318,637 B2
(45) Date of Patent: Jun. 11, 2019

(54) ADDING BACKGROUND SOUND TO SPEECH-CONTAINING AUDIO DATA

(71) Applicant: Sony Mobile Communications Inc., Tokyo (JP)

(72) Inventor: Ola Thörn, Limhamn (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 15/594,581

(22) Filed: May 13, 2017

(65) Prior Publication Data

US 2017/0352361 A1 Dec. 7, 2017

(30) Foreign Application Priority Data

Jun. 3, 2016 (EP) ..................................... 16172863

(51) Int. Cl.
*G06F 17/27* (2006.01)
*G06F 16/683* (2019.01)
(Continued)

(52) U.S. Cl.
CPC ........ *G06F 17/2785* (2013.01); *G06F 16/685* (2019.01); *G06F 17/279* (2013.01); *G06F 17/2765* (2013.01); *G09B 5/062* (2013.01); *G10L 15/02* (2013.01); *G10L 15/24* (2013.01); *G10L 15/265* (2013.01); *G10L 21/02* (2013.01); *G10L 21/0202* (2013.01); *G10L 25/48* (2013.01); *G10L 25/63* (2013.01);
(Continued)

(58) Field of Classification Search
CPC ........... G06F 17/30746; G06F 17/2785; G11B 27/031; G10L 17/26; G10L 25/87
See application file for complete search history.

(56) References Cited

U.S. PATENT DOCUMENTS

| 2006/0122842 | A1* | 6/2006 | Herberger | G10H 1/368 704/278 |
| 2015/0255066 | A1* | 9/2015 | Wilder | G06K 9/00744 704/235 |
| 2016/0124909 | A1* | 5/2016 | Basson | G10L 25/27 715/732 |

FOREIGN PATENT DOCUMENTS

EP  1666967 A1  6/2006

OTHER PUBLICATIONS

European Search Report for corresponding European Patent Application No. 16172863.9, completed Jul. 8, 2016.
(Continued)

*Primary Examiner* — Richa Mishra
(74) *Attorney, Agent, or Firm* — Tucker Ellis LLP

(57) ABSTRACT

An editing method facilitates the task of adding background sound to speech-containing audio data so as to augment the listening experience. The editing method is executed by a processor in a computing device and comprises obtaining characterization data that characterizes time segments in the audio data by at least one of topic and sentiment; deriving, for a respective time segment in the audio data and based on the characterization data, a desired property of a background sound to be added to the audio data in the respective time segment, and providing the desired property for the respective time segment so as to enable the audio data to be combined, within the respective time segment, with background sound having the desired property. The background sound may be selected and added automatically or by manual user intervention.

16 Claims, 3 Drawing Sheets

(51) Int. Cl.
  *G10L 21/02* (2013.01)
  *G10L 25/48* (2013.01)
  *G10L 25/63* (2013.01)
  *G10L 15/02* (2006.01)
  *G10L 15/26* (2006.01)
  *G10L 15/24* (2013.01)
  *G11B 27/031* (2006.01)
  *G09B 5/06* (2006.01)
  *G10L 15/18* (2013.01)
  *G10L 25/87* (2013.01)
  *G10L 17/26* (2013.01)
(52) U.S. Cl.
  CPC ........ *G11B 27/031* (2013.01); *G10L 15/1822* (2013.01); *G10L 15/26* (2013.01); *G10L 17/26* (2013.01); *G10L 25/87* (2013.01)

(56) References Cited

OTHER PUBLICATIONS

Arora, Shipra J. et al., "Automatic Speech Recognition: A Review", International Journal of Computer Applications, vol. 60, No. 9, Dec. 2012, pp. 34-44.

Bamman, David et al., "Contextualized Sarcasm Detection on Twitter", Proceedings of the Ninth International AAAI Conference on Web and Social Media, 2015, pp. 574-577.

Medhat, Walaa et al., "Sentiment analysis algorithms and applications: A survey", Ain Shams Engineering Journal (2014) 5, May 27, 2014, pp. 1093-1113.

Poria, Soujanya et al., "Fusing audio, visual and textual clues for sentiment analysis from multimodal content", Neurocomputing 174 (2016), pp. 50-59.

* cited by examiner

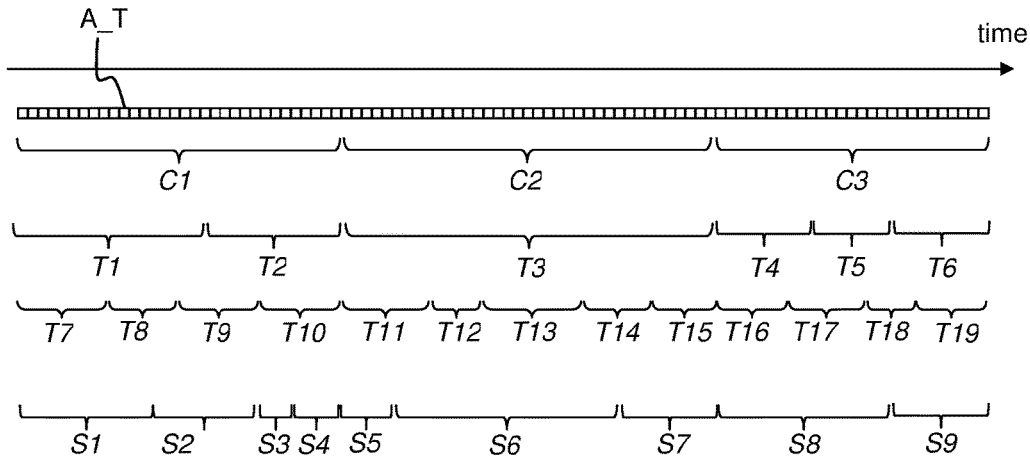
FIG. 3
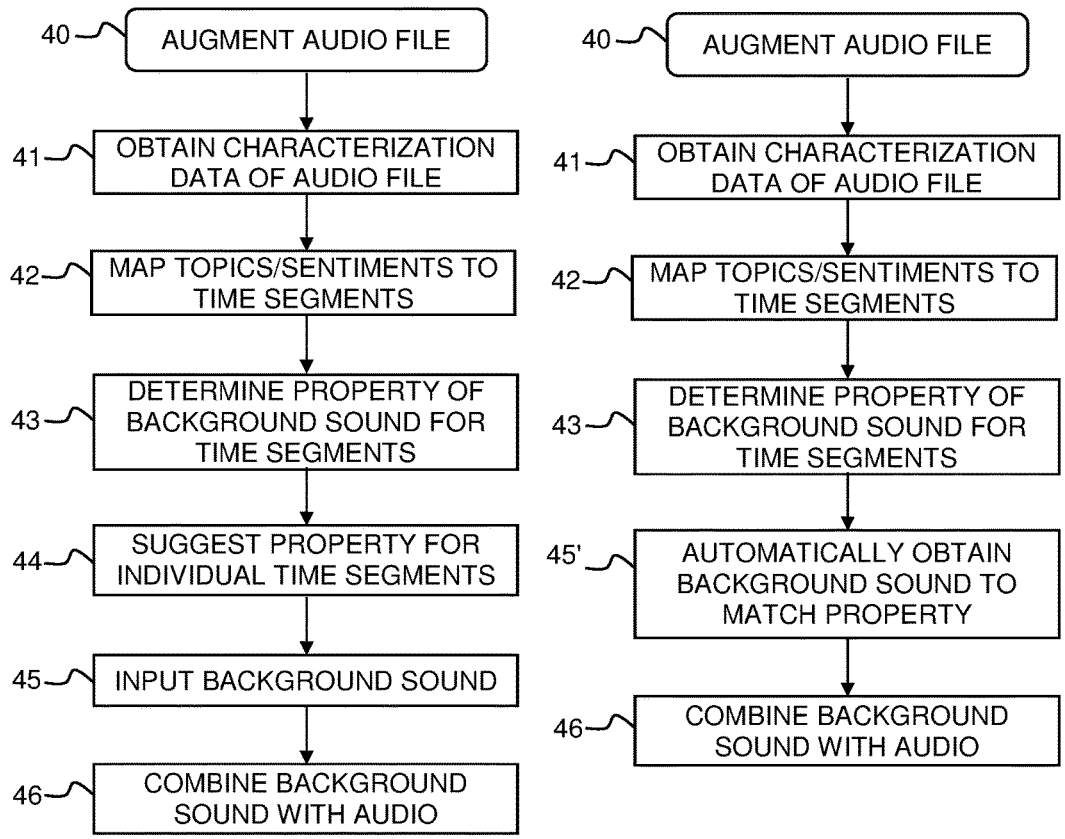
FIG. 4A
FIG. 4B

ADDING BACKGROUND SOUND TO SPEECH-CONTAINING AUDIO DATA

RELATED APPLICATION DATA

This application claims the benefit of European Patent Application No. 16172863.9, filed Jun. 3, 2016, the disclosure of which is incorporated herein by reference in its entirety.

TECHNICAL FIELD

The present invention relates generally to techniques for augmenting speech-containing audio data by adding background sound.

BACKGROUND ART

In modern society, it is commonplace to distribute digital media files. Digital audio files containing speech have gained increasing popularity and are available for download or online streaming over the Internet. Such speech-containing audio files include so-called audiobooks or talking books, which are recordings of a literary text being read out loud, as well as so-called podcasts, which are episodic series of audio recordings. Digital audio files, like other digital media files, are made available by professional actors, such as media companies, as well as by less professional actors and private individuals. The professional actors have access to advanced equipment and trained personnel that are skilled in the art of editing and producing audio files to provide a good listening experience. To increase the depth of the listening experience, it is not uncommon that professional speech-containing audio files contain background sound, such as music and other environmental sounds. The background sound is thus added to dynamically match the content and context of the spoken language in the audio file.

There is a wide variety of conventional computer programs ("audio editors") that allow a user to manually edit and master audio files. Some of these conventional audio editors also allow the user to manually select and import background sound. However, even for a professional user, it is a complex and labor-intensive task to add background sound to an audio file. For a non-professional user, it is an even greater challenge to use this type of audio editor, at least to achieve a truly good listening experience.

In essence, a user that wants to add background sound to an audio file using a conventional audio editor need to go through a labor-intensive sequence of steps, such as to listen through the entire audio file, think about what background sound might be appropriate in different parts of the audio file, find or create sound files for the background sound, import the sound files, find the proper location for each sound file in the audio file, select a starting point and an end point for each sound file in the audio file, and select the correct volume of each sound file in relation to speech in the different parts of the audio file.

BRIEF SUMMARY

It is an objective of the invention to at least partly overcome one or more limitations of the prior art.

Another objective is to facilitate the task of adding background sound to speech-containing audio data.

A further objective is to facilitate the task of augmenting the listening experience by adding background sound to speech-containing audio data.

One or more of these objectives, as well as further objectives that may appear from the description below, are at least partly achieved by a method of augmenting speech-containing audio data on a computing device, a computer-readable medium, and a computing device for augmenting speech-containing audio data, embodiments thereof being defined by the dependent claims.

A first aspect of the invention is a method of augmenting speech-containing audio data on a computing device comprising a processor. The method is executed by the processor in the computing device and comprises: obtaining characterization data that characterizes time segments in the audio data by at least one of topic and sentiment; deriving, for a respective time segment in the audio data and based on the characterization data, a desired property of a background sound to be added to the audio data in the respective time segment; and providing the desired property for the respective time segment so as to enable the audio data to be combined, within the respective time segment, with background sound having the desired property.

By indicating the desired property of background sound in different time segments in the audio data, the first aspect greatly facilitates the task of adding background sound that is properly matched to the content and/or context of the speech in the audio data. The characterization data may be pre-generated to represent the speech in the audio data and stored in a memory which is accessible to the processor of the computing device. The processor of the first aspect may thus retrieve such pre-generated characterization data from the memory. Alternatively, the characterization data may be generated on demand, by the method including a dedicated processing step that operates on the audio data to generate the characterization data. In either case, the characterization data at least partly results from an automated analysis of the speech in the audio data, which allocates topics and/or sentiments to individual time segments in the audio data.

The first aspect may be implemented to allow an operator to manually and independently locate or create background sound that matches the desired property. Since the desired property is derived or generated based on topics and/or sentiments resulting from an automated analysis of the speech in the audio data, the first aspect will increase the likelihood that the added background sound properly matches the speech and augments the listening experience, especially if the operator is inexperienced in editing audio files.

Alternatively, the first aspect may be implemented to automatically locate or create background sound with the desired property, and possibly also add the background sound to the audio data in synchronization with the respective time segment.

In a first implementation of the first aspect, the characterization data characterizes the time segments in the audio data at least by topic.

In a second implementation of the first aspect, the characterization data characterizes the time segments in the audio data at least by sentiment.

In a third implementation of the first aspect, the characterization data characterizes the time segments in the audio data at least by topic and sentiment.

In one embodiment, the topic represents substance or theme of spoken language within the respective time segment in the audio data. Thus, each topic is not represented by an individual word extracted in isolation from the spoken language but is obtained by dividing the spoken language into topically-coherent segments, where each segment comprises a plurality of words and, typically, a plurality of sentences or utterances. Each topic may, but need not, be represented by one or more nouns. The topic may e.g. designate an object, a location, or a time period. The topic may be given on a single level of granularity for the speech in the audio data, or on at least two different levels of granularity. The granularity generally corresponds to the number of topics that are generated for the speech in the audio data, and a higher granularity corresponds to a higher level of detail about the topics in the speech. The provision of topics at more than one level of granularity may improve the ability of the method to augment the audio data with representative background data. For example, topics that overlap in time and are given on different granularity may be combined when deriving the desired property for a time segment in the audio data. Further, topics at more than one level of granularity makes it possible to augment the audio data with background sound for each level, which means that background sounds for different levels are superimposed in the augmented audio data.

In one embodiment, the desired property is derived to match the topic and/or the sentiment of the respective time segment, e.g. by applying a predefined set of rules on the topic(s) and/or sentiment(s) associated with the respective time segment. The desired property may, but need not, be represented by one or more keywords or labels. In a specific embodiment, the desired property is derived to match at least the topic of the respective time segment.

In one embodiment, the sentiment represents emotion of spoken language within the respective time segment in the audio data and comprises one or more of: a positive sentiment, a negative sentiment, a neutral sentiment, anger, joy, sadness, surprise, accusation, fear, anxiety, unpleasantness, disgust, relief, desire, love, hate, calm, excitement and suspense.

In one embodiment, the desired property is derived at least partly based on the sentiment of the respective time segment and is indicative of one or more of: a playback volume of the background sound, a tempo of the background sound, a tonality of the background sound, and a mood of the background sound.

In one embodiment, the characterization data further characterizes the time segments in the audio data by literary category, and the desired property is further derived to match the literary category of the respective time segment. For example, the literary category may comprise one or more of: poetry, prose, interview, documentary, conversation, review, drama, chronicle, commercial, academic text and keynote, said prose optionally being subdivided into literary genres.

In one embodiment, the step of obtaining the characterization data comprises processing the audio data by natural language processing.

In one embodiment, the step of obtaining the characterization data comprises: generating text corresponding to the audio data by operating a speech recognition algorithm on the audio data, associating the text with time points in the audio data, operating a topic segmentation algorithm and/or a sentiment analysis algorithm on the text to determine topics and/or sentiments in the text, each topic and/or sentiment being determined for a respective text segment in the text, said method further comprising generating the characterization data by determining time segments in the audio data corresponding to the text segments and generating an association between the time segments and topic identifiers representing the topics and/or sentiment identifiers representing the sentiments. As noted above, each text segment may comprise a plurality of words or sentences.

In one embodiment, the step of obtaining characterization data comprises: processing the audio data for extraction of audio features, analyzing the audio features for determination of a sentiment for at least one time segment the audio data, and generating an association between the at least one time segment and a sentiment identifier representing the sentiment.

In one embodiment, the audio data is associated with image data to be played in synchronization with the audio data, and the step of obtaining characterization data comprises: analyzing the image data for determination of topics and/or sentiments in the image data, and generating an association between time segments in the audio data and topic identifiers representing the topics and/or sentiment identifiers representing the sentiments.

In one embodiment, the method further comprises: obtaining a context identifier that represents a context of existing background sound within a time segment in the audio data, and selectively determining if background sound is to be added to the time segment based on a comparison of the context identifier to one or more topics given by the characterization data for the time segment.

In one embodiment, the method further comprises: displaying, on a display, a selection of options for deriving the desired property, receiving a user selection of one of the options, and deriving the desired property based on the user selection, wherein the selection of options comprises one or more of deriving the desired property based on topic only, deriving the desired property based on sentiment only and deriving the desired property based on topic and sentiment.

In one embodiment, the step of providing the desired property comprises: displaying, on a display, an option for allocating background sound to the respective time segment together with an indication of the desired property for the respective time segment, receiving a user selection of one or more sound files containing background sound for the respective time segment, and generating augmented audio data by combining the audio data within the respective time segment with the background sound in the one or more sound files.

In an alternative embodiment, the method further comprises: automatically obtaining background sound having the desired property of the respective time segment, and generating augmented audio data by combining the audio data within the respective time segment with the background sound. For example, the step of automatically obtaining the background sound may comprise at least one of: obtaining one or more sound files from a library of background sound and algorithmically generating the background sound.

A second aspect of the invention is a computer-readable medium comprising computer instructions which, when executed by a processor, cause the processor to perform the method of the second aspect or any of its embodiments.

A third aspect of the invention is a computing device for augmenting speech-containing audio data. The computing device is configured to: obtain characterization data that characterizes time segments in the audio data by at least one of topic and sentiment; derive, for a respective time segment in the audio data and based on the characterization data, a desired property of a background sound to be added to the audio file in the respective time segment; and provide the desired property for the respective time segment so as to enable the audio data to be combined, within the respective time segment, with background sound having the desired property.

The computing device of the third aspect may alternatively be defined to comprise: means for obtaining characterization data that characterizes time segments in the audio data by at least one of topic and sentiment; means for deriving, for a respective time segment in the audio data and based on the characterization data, a desired property of a background sound to be added to the audio file in the respective time segment; and means for providing the desired property for the respective time segment so as to enable the audio data to be combined, within the respective time segment, with background sound having the desired property.

The second and third aspects share the advantages of the first aspect. Any one of the above-identified embodiments of the first aspect may be adapted and implemented as an embodiment of the second and third aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

FIG. 3 is a schematic illustration of the method in FIG. 2 applied to text generated for an audio file.

FIGS. 4A-4B are flow charts of methods of augmenting audio data on the computing device in FIG. 1 according to embodiments of the invention.

DETAILED DESCRIPTION OF EXAMPLE EMBODIMENTS

Figure 1:
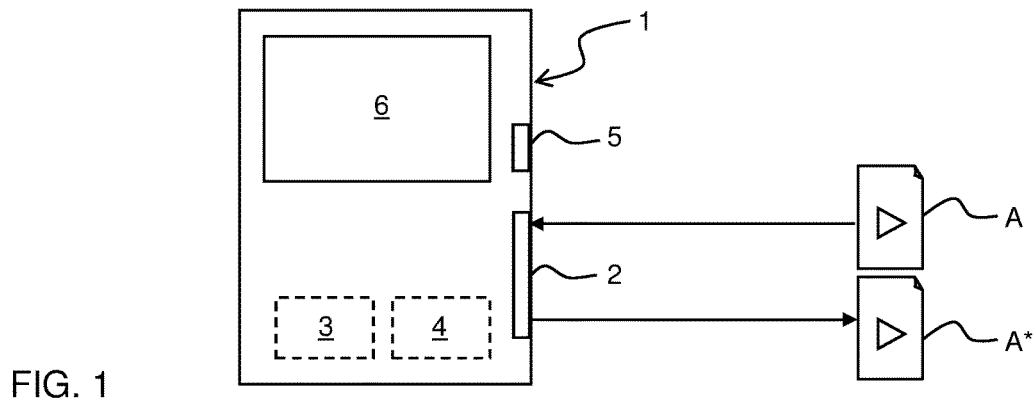
FIG. 1 is a schematic view of a computing device for augmenting audio data.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Embodiments of the invention are directed to a technique of adding background sound to speech-containing audio data, specifically for the purpose of augmenting the audio data. To truly augment the audio data, the background sound needs to be carefully selected to match the content and context at different time points in the audio data. On a general level, this is achieved by applying computer-implemented algorithms for analyzing the speech in the audio data to determine topics and/or sentiments of the speech, and possibly other content or context indicators, as a function of time in the audio data, and by enabling the background sound to be added to the audio data so as to match the topics and/or sentiments at different time points in the audio data. Embodiments of the invention may be implemented by one or more computing devices which execute one or more dedicated computer programs so as to allow a user to input audio data to be augmented. Embodiments of the invention may enable the user to manually select the background sound to be added to the audio data, by instructing the user to provide background sound having certain desired properties that match the topics and/or sentiments at the different time points in the audio data. Other embodiments of the invention may automatically add background sound having the desired properties at the different time points in the audio data.

Before describing embodiments of the invention in more detail, a few further definitions will be given.

As used herein, "audio data" designates audio signals that have been encoded in digital form in any audio coding format and may be uncompressed or compressed, as is well-known in the art. The audio data may be provided to the computing device as a bitstream in an audio coding format or as embedded in a file with a defined storage layer. Such audio formats include but are not limited to WAV, AIFF, AU, RAW Audio, FLAC, WavPack, Monkey's Audio, ALAC, MPEG-4 SLS, MPEG-4 ALS, MPEG-4 DST, WMA Lossless, Shorten, Opus, MP3, Vorbis, Musepack, AAC, ATRAC, WMA lossy, etc.

As used herein, "speech" relates to the vocalized form of human communication which is based upon a syntactic combination of words. Each spoken word is created out of a phonetic combination of a limited set of vowel and consonant speech sound units generated by speech organs of a human body.

As used herein, "speech-containing audio data" is any form of audio data that contains speech and is capable of being stored, fully or partly, in an electronic memory. This type of audio data includes but is not limited to audiobooks, podcasts, radio transmissions, as well as audio tracks for movies, television transmissions, video games, keynote presentations, etc.

As used herein, "background sound" denotes any type of environmental sound that may be added to speech-containing audio data so as to supplement the speech therein. The background sound may include music, artificially created or enhanced sound effects, pre-recorded natural sounds, etc.

As used herein, a "sound file" denotes a data file that contains background sound. The sound file may be in any of the audio formats listed above.

As used herein, "natural language processing" (NLP) is given its ordinary meaning and refers to computer-based techniques for processing natural languages, i.e. languages that develop naturally in humans through use and repetition without any conscious planning or premeditation of their own. NLP includes but is not limited to computer algorithms and techniques for word and sentence tokenization, text classification and sentiment analysis, spelling correction, information extraction, parsing, text mining, keyword extraction, and named entity disambiguation (NED).

As used herein, "speech recognition" (SR) is given its ordinary meaning and designates NLP algorithms or techniques for recognition and translation of spoken language into computer-readable text. SR is also known as "automatic speech recognition" (ASR), "computer speech recognition", or "speech to text" (STT). Many algorithms are known in the art, e.g. as presented in the article "Automatic Speech Recognition: A Review", by Arora et al, published in International Journal of Computer Applications, 60(9):34-44, 2012, and references cited therein. Speech recognition results in an ordered sequence of text items, typically words.

As used herein, "topic segmentation" is given its ordinary meaning and designates NLP algorithms and techniques for, by a computer program, analyzing a text portion containing multiple topics, and discovering these topics automatically. As used herein, the term "topic" is given its common meaning in linguistics. Thus, the topic of a sentence is what is being talked about. In the field of linguistics, topic is also denoted "theme", "narrative" or "substance". Many topic segmentation algorithms are known in the art, e.g. as presented in the dissertation "Topic Segmentation: Algorithms and Applications" by Reynar, 1998, and references cited therein. The term "topic segmentation" as used in the present application does not imply any specific granularity of the topics to be identified. Thus, a topic segmentation algorithm may provide a coarse-grained description of the content in the text portion, such that each topic is applicable to relatively large chunks of text, or a more fine-grained description for relatively smaller units of text, or a combination thereof. In the field of natural language processing, the finer-grained topic analysis is sometimes referred to as "discourse segmentation", which is considered part of topic segmentation for the purposes of the present application.

As used herein, "sentiment analysis" is given its ordinary meaning and designates algorithms and techniques for, by a computer program, analyzing speech to identify and extract subjective information. Algorithms for sentiment analysis may operate on text (linguistic-based algorithms) and/or speech (acoustic-based algorithms). Algorithms that operate on speech may derive and analyze one or more acoustic (prosodic) features of speech, such as pause, pitch, duration, speed, loudness and timbre, and other acoustic features such as bandwidth, beat histogram, spectral flux, spectral centroid, mel-frequency cepstral coefficients etc., e.g. as described in the article "Fusing audio, visual and textual clues for sentiment analysis from multimodal content" by Poria et al, published in Neurocomputing 174 (2016) 50-59, and references cited therein. Many linguistic-based algorithms are known in the art, e.g. as described in the article "Sentiment analysis algorithms and applications: A survey", by Medhat et al, published in Ain Shams Engineering Journal (2014) 5, 1093-1113, and references cited therein.

As used herein, "literary category analysis" designates algorithms and techniques for, by a computer program, analyzing text to allocate the text, or portions thereof, to predefined literary categories. Such algorithms and techniques are commonly denoted "document classification" or "document categorization".

FIG. 1 illustrates a computing device 1 which is configured to receive audio data A. In FIG. 1, the audio data A is illustrated as a file and will be denoted "audio file" in the following. The computing device 1 receives the audio file A via a data interface 2. The data interface 2 may be a wireless interface for wireless connection to an external device that stores the audio file A, or a port for physical interconnection with such an external device, optionally by wire. The computing device 1 further comprises a processor 3 and electronic memory 4. The memory 4 stores a computer program ("audio editing program") which, when executed by the processor 3, causes the computing device 1 to selectively add background sound to the audio file so as to produce augmented audio data A*. As noted above, the background sound may be provided to the audio editing program manually or automatically.

The computing device 1 may include a media player program which is operable to play the audio file A and the augmented audio data A*, by causing the computing device 1 to provide a corresponding electrical signal to an audio output unit 5. The audio output unit 5 may be a loudspeaker, an audio socket or a wireless transmitter. The media player program thereby allows the user of the audio editing program to listen to selected time segments of the audio file A and the augmented audio data A* during the process of adding background sound.

The computing device 1 further comprises a user interface 6 which allows the user to interact with the computing device 1, including the audio editing program and the media player. The user interface 6 may include one or more of a touch screen, a display, a keyboard, a key pad, a touch pad, a mouse, a thumb-wheel, a pointer device such as a stylus, an eye tracker, a voice command device, a gesture recognition device, etc.

The computing device 1 may be any type of apparatus capable of executing a computer program for adding background sound to the audio file A, including but not limited to a mobile phone, a personal computer, a laptop computer, and a tablet computer.

Figure 2:
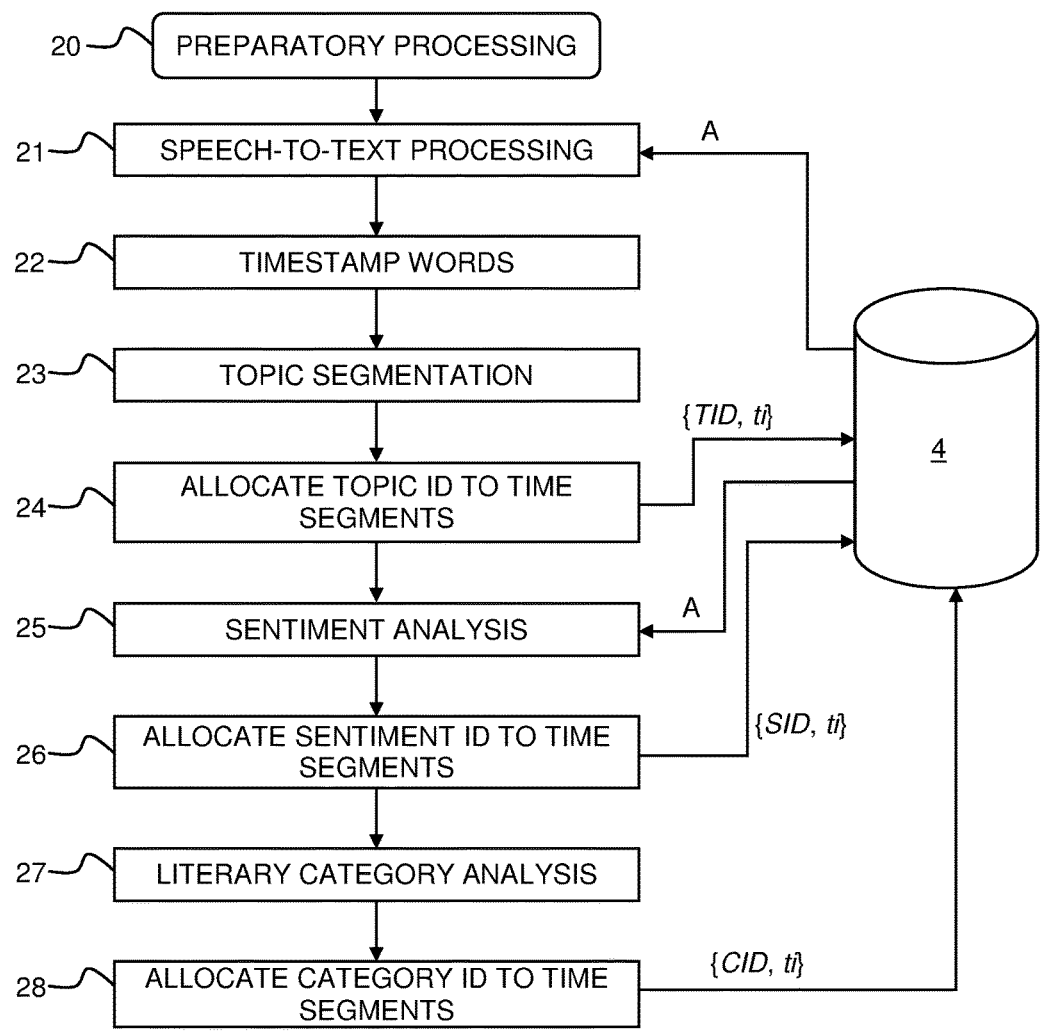
FIG. 2 is a flow chart of method for preparatory processing of audio data.
Figure 5A:
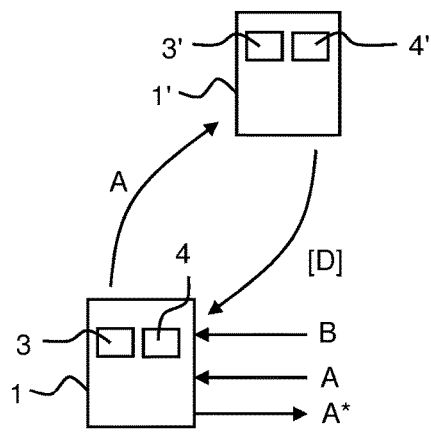
FIGS. 5A-5B are schematic illustrations of computing devices that implement a combination of the methods in FIG. 2 and FIGS. 4A-4B, according to two examples.
Figure 5B:
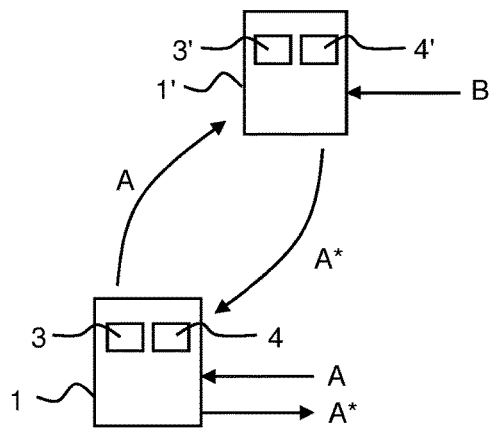

In the following, embodiments of the invention will be exemplified in relation to FIGS. 2-5, where FIGS. 2-3 illustrate a method of preparatory processing of the audio file A, FIGS. 4A-4B illustrate methods of editing the audio file A by adding background sound based on the output of the preparatory processing, and FIGS. 5A-5B illustrate different combinations of computing devices for implementing the preparatory processing and the editing of the audio file.

In the example of FIG. 2, the preparatory processing 20 is executed by the processor 3 and is operated on the entire audio file A in advance of audio editing (FIGS. 4A-4B), to generate characterization data for the audio file A. As will be further exemplified below, the characterization data provides a compact definition of the content and context of the speech in the audio file A as a function of time. The preparatory processing 20 may operate in relation to the memory 4 of the computing device 1, as shown in FIG. 2, and/or in relation to an external memory (not shown) which is accessible to the computing device 1, e.g. a memory in the above-mentioned external device. In a further alternative, the preparatory processing 20 is executed separately from the computing device 1 and the resulting characterization data is then transferred to the computing device 1, e.g. as metadata in the audio file A, or in a separate data file. Further alternatives of the preparatory processing 20 are discussed below with reference to FIGS. 5A-5B.

In the example of FIG. 2, the preparatory processing 20 is configured to identify and characterize topics, sentiments and literary categories of speech in the audio file A over time.

In step 21, the audio file A is retrieved from memory 4 and subjected to speech-to-text processing by operating a speech recognition algorithm on the audio file A. The output of step 21 is a time-sequence of words. In step 22, the words are time-stamped so as to associate the respective word with a time point in the time frame of the audio file A. Although not shown in FIG. 2, the time-stamped words may be stored in memory 4. By the time-stamping, the text produced by step 22 is associated with time points in the audio file A. Subsequent to step 22, not shown in FIG. 2, a sentence segmentation algorithm may be operated on the time-stamped words to identify individual sentences, if required by subsequent algorithms in steps 23, 25 and 27.

In step 23, a topic segmentation algorithm is operated on the time-stamped words generated by steps 21-22, optionally organized into sentences, to mine the text to identify the underlying theme, narrative or substance of the text, with a granularity that produces topics as a function of time. Typically, the topics are nouns, and may denote a name, an object, a location, a (historic) time period, etc. The topic segmentation algorithm may be configured to operate on the text with more than one level of granularity to identify topics at different level of detail. For each level of granularity, the topic segmentation algorithm divides the text into topically-coherent text segments, where each text segment comprises a plurality of words, and typically a plurality of sentences or utterances. Each level of granularity may be associated with a respective maximum length of the text segments, so that different maximum lengths are applied by the topic segmentation algorithm to generate topics at different granularity. Step 24 processes the output of the topic segmentation algorithm and allocates a topic ID to individual text sequences. As used herein, a "text sequence" may contain any number of words or sentences. Each text sequence is associated, by the time stamps, with a time segment in the audio file A. The topic ID may be given as one or more keywords. If the keywords are predefined, the topic ID may be an index for the respective keyword, otherwise the topic ID may be given in plain text. Step 24 also stores the association between topic ID (indicated by TID in FIG. 2) and time segments (indicated by ti in FIG. 2) in a database in memory 4. Each time segment may be identified by start and end times in the audio file A. As used herein, a database may include any conceivable data structure, such as one or more tables, lists, arrays, associative arrays, graphs, trees, etc.

In a simplified variant, which does not involve a topic segmentation, step 23 produces the topics by merely extracting individual words perceived as important in the text in the audio file. The time segment for each such topic may be given by the extent of the individual word or as a predefined time period around the individual word.

Steps 23-24 may involve, in addition to the above-described topic segmentation or word extraction, a sub-step of detecting existing background sound in the audio file A, and assigning a respective context identifier to time segments in the audio file A based on an analysis of the context of the existing background sound. For example, the analysis of existing background sound may result in a generic context such as "indoors" and "outdoors", as well as more specific context, such as "restaurant", "coffee shop", "traffic", "animals", "children", etc.

In step 25, a linguistic-based sentiment analysis algorithm may be operated on the time-stamped words generated by steps 21-22, optionally organized into sentences, to identify sentiments in the text, preferably with a granularity that produces sentiments as a function of time. Alternatively or additionally, as indicated for step 25 in FIG. 2, the audio file A may be retrieved from memory 4 and an acoustic-based sentiment analysis algorithm may be operated on the audio file A to identify sentiments in the speech. Step 26 processes the output of the sentiment analysis algorithm(s) and allocates a sentiment ID to individual time segments in the audio file. Step 26 also stores the association between sentiment ID (indicated by SID in FIG. 2) and time segments (indicated by ti in FIG. 2) in the database in memory 4.

The sentiment analysis in step 25 may be implemented to identify polarity, e.g. to discriminate between a positive, a negative and a neutral sentiment. Alternatively or additionally, the sentiment analysis may be configured to identify more fine-grained sentiments, such as one or more of anger, joy, sadness, surprise, accusation, fear, anxiety, unpleasantness, disgust, relief, desire, love, hate, calm, excitement and suspense.

In step 27, a literary category analysis algorithm is operated on the time-stamped words generated by steps 21-22, optionally organized into sentences, to allocate one or more predefined literary categories to the text. The algorithm may be configured to allocate a single category to the entire text or to discriminate between different categories within the text. The predefined literary categories may include one or more poetry, prose, interview, documentary, conversation, review, drama, chronicle, commercial, academic text and keynote. Furthermore, the prose category may be further subdivided by literary genre, such as crime, drama, fantasy, science fiction, horror, thriller, western, comic, fairy tale, fable, tragedy, etc. Step 28 processes the output of the literary category algorithm and allocates a category ID to one or more time segments in the audio file. Step 28 also stores the association between category ID (indicated by CID in FIG. 2) and time segments (indicated by ti in FIG. 2) in the database in memory 4.

It should be understood that the steps of the preparatory processing 20 need not be executed in the particular order shown in FIG. 2. Further, it is conceivable that the output of one algorithm may be used as input by another algorithm. For example, the topic segmentation of step 23 may take into account the categories identified in step 27. It is also conceivable that two or more of the algorithms in FIG. 2 are executed jointly. For example, topic segmentation and sentiment analysis may be combined to identify a punch line of a joke in the audio file A. This type of combined analysis is e.g. known from the article "Contextualized Sarcasm Detection on Twitter", by Bamman and Smith, published in the Proceedings of the Ninth International AAAI Conference on Web and Social Media (2015). Further, one or more of the algorithms in FIG. 2 may be excluded if the output of the algorithm(s) is not needed for the editing of the audio file A. It is also conceivable that the preparatory processing 20 is configured to identify further characterization data representing the content and context of the audio file A. For example, different speakers may be identified and allocated to different time segments by operating a voice recognition algorithm on the audio file A.

After completion of steps 21-28, the database in memory 4 contains the characterization data which is used by the audio editing program (FIGS. 4A-4B) when operated to add background sound to the audio file A. An example of the characterization data is schematically depicted in FIG. 3, in relation to a text A_T obtained by speech-to-text processing of an audio file A. For exemplification purposes only, sentences in the text are represented by squares arranged along a time line of the audio file. In the illustrated example, the topics are given at two levels of granularity: T1-T6 and T7-T19, three literary categories C1-C3 are included and nine sentiments S1-S9 have been identified.

In one example, the text A_T in FIG. 3 has been generated for a podcast A with three parts: an interview with an explorer about a trip to the Amazon rainforest, a travel report about the city of New York, and a casual conversation between two farmers. The three parts correspond to the categories C1-C3 indicated in FIG. 3, which may be identified by step 27 as interview (C1), documentary (C2), conversation (C3). In this particular example, the following main topics are identified by step 23: Manaus (T1), Amazon (T2), New York (T3), farming (T4), cows (T5), piglings (T6), with the following sub-topics: airplane (T7), hotels (T8), excursions (T9), jungle (T10), Manhattan (T11), shopping malls (T12), 1920's (T13), Empire State Building (T14), Central Park (T15), tractor (T16), hay (T17), sickness (T18), docking (T19). The following sentiments are identified by step 25: neutral (S1), positive (S2), suspense (S3), calm (S4), excitement (S5), negative (S6), joy (S7), neutral (S8), sadness (S9).

Although, the topics in the above example are represented by a single keyword, it is generally conceivable that the respective topic is represented by a combination of keywords. It is likewise generally conceivable that more than one sentiment is associated with a time segment.

FIG. 4A is a flow chart of an editing method 40 according to a first embodiment. In the example of FIG. 4A, the editing method 50 comprises steps 41-46 and is executed by the processor 3 in accordance with an editing program on the computing device 1. In step 41, the editing method obtains the characterization data, either by invoking the preparatory processing 20 in FIG. 2, or by retrieving previously generated characterization data for the audio file A from the memory 4. In step 42, the editing method maps the identifiers to time segments in the audio file A to produce a mapping of the type shown in FIG. 3, if the characterization data does not already contain such a mapping. In step 43, the editing method determines a desired property of background sound to be added to different time segments. The property is determined as a function of the topic(s) and/or sentiment(s) associated with the respective time segment, while possibly also taking the literary category into account. Basically, the desired property is determined by applying a predetermined logic (i.e. a set of rules) to the topic IDs, the sentiment IDs and the category IDs so as to produce one or more keywords that match, in a broad sense, the content and context of individual time segments in the audio file.

As an example, revert to FIG. 3. By only considering the main topics, the editing method 40 may determine the properties "city" for the time segment of T1, "jungle" for the time segment of T2, "city" for the time segment of T3, "farm" for the time segment of T4, "cow" for the time segment of T5 and "pig" for the time segment of T6. It is realized that the properties may be refined by use of the sub-topics T7-T19. Furthermore, the category may be included in the property, such as "city, interview" for the time segment of T1, "city, documentary" for the time segment of T3, and "farm, conversation" for the time segment of T4. Alternatively or additionally, the sentiment may be included in the property, such as "jungle, suspense" for the time segment of S3 and "city, excitement" for the time segment of S5. As a further alternative, only the sentiments may be considered, e.g. resulting in the properties "suspense" for the time segment of S3, "excitement" for the time segment of S5, and "sadness" for the time segment of S9.

As understood from the foregoing, the properties that are determined based on sentiment (either alone or in combination with topic) may generally indicate a desired mood of the background sound. Alternatively or additionally, such properties may indicate a desired playback volume of the background sound, a desired tempo of the background sound, or a tonality of the background sound (e.g. major or minor), or any combination thereof. For example, it may be desirable to increase (gradually or stepwise) the playback volume of the background sound for time segments with sentiment "suspense" or "excitement", and decrease (gradually or stepwise) the playback volume for time segments with sentiment "calm" or "sadness". Likewise, it may be desirable to add background sound (music) of major tonality for a time segment with sentiment "joy", and minor tonality for a time segment with sentiment "sadness".

In the above-mentioned example of detecting sarcasm or humor, the preparatory processing 20 may be implemented to specifically detect the timing of a punch line of the sarcasm or humor, e.g. a joke, and include in the characterization data an association between the punch line and the corresponding time segment. Based on this association, step 43 may set the desired property to "punch line", or to a more specific property, such as "laughter", "applause" or "drum roll", enabling the audio file to be augmented with the appropriate background sound by the subsequent steps in FIG. 4A or FIG. 4B. It is conceivable that different logic is used for determining the desired property in different parts of an audio file. It is also conceivable that the logic for determining the desired properties of background sound in the audio file, or part thereof, is selected based on a setting selected in the editing program by the user. For example, the user may select if the desired property (and thereby the background sound) is to be determined based on topic only, based on sentiment only, or based on both topic and sentiment. Alternatively or additionally, the editing method 40 may apply different logic for different literary categories (automatically or given by a setting selected by the user). In one example, the properties for category "prose" may be given by sentiment only, whereas the properties for category "interview" may be given by topic only, etc.

Reverting to FIG. 4A, in step 44, the editing method presents the property determined by step 43 for each time segment on the user interface 6 and enables the user to input an appropriate background sound for each time segment. For example, the editing method may operate the computing device 1 to generate a dedicated graphical user interface on a display to present the properties, optionally in juxtaposition to a graphical representation of the audio file A and/or a time line of the audio file A. The user may e.g. be given the option to link the respective time segment to a sound file in a library of background sound, either on the computing device 1 or on another device, e.g. a web server. To facilitate for the user to select proper background sound, it is conceivable that the terminology of the properties suggested in step 44 are represented as keywords or labels which at least partly match the metadata (tags) used to represent sound files in existing libraries of background sound.

In step 45, the editing method inputs the background sound selected by the user in step 44. In step 45, the user may also be given the ability to test the background sound in combination with the speech in the audio file and to manually adjust playback properties of the background sound in relation to the speech, e.g. volume, treble, bass, balance, timing, etc. It is also conceivable that the editing method automatically adjusts the playback volume of the background sound to the speech in the respective time segment. In this process, the editing method may also adjust the playback volume based on the sentiment of the time segment, e.g. to increase the volume of background music for a time segment with sentiment "suspension", "fear" or "excitement".

Then, in step 46, the editing method combines the background sound with the speech in the audio file A to produce augmented audio data A*. The background sound may either be incorporated into the audio file or be stored in a separate data file to be played in synchronization with the audio file A.

FIG. 4B depicts an editing method 40 according to a second embodiment. Steps 41-43 and 46 are identical to the corresponding steps in FIG. 4A and the foregoing description is equally applicable to FIG. 4B. Compared to FIG. 4A, steps 44-45 are omitted and replaced by a step 45', in which the editing method automatically obtains background sound to match the property of the respective time segment, as determined by step 43. The editing method may acquire the background sound as a sound file from a library of background sound, either on the computing device 1 or on another device, e.g. a web server. To facilitate such automatic retrieval of sound files, the terminology of the properties determined in step 43 may be selected to match the metadata (tags) used to represent sound files in the library of background sound. It is also conceivable, as an alternative or supplement to sound files, that the editing method algorithmically generates background sound that matches the property of the respective time segment. Algorithmic sound generation is well-known in the art. For example, there are existing computer programs known as algorithmic composers which create sound tracks by using mathematical equations and number sequences to control parameters such as pitch, tempo and rhythm. There are also computer programs that produce sound tracks by splicing together snippets of live recordings. Irrespective of the origin of the background sound, step 45' may also automatically adjust playback properties of the background sound in relation to the speech, e.g. volume, treble, bass, balance, etc., optionally based on the sentiment of the respective time segment. It is also conceivable that step 45' modulates the speech in the audio file A to match a desired property determined by step 43. The modulation may involve changing one or more acoustic parameters of the speech, such a pitch, echo, duration, speed, loudness, timbre, etc. This modulation may be made instead of adding a background sound, or to supplement an added background sound. The modulation may be made only for certain sentiments and/or topics. In one example, if the sentiment indicates that the speaker is strained, the speech may be modulated accordingly. In another example, if the topic indicates that the speaker is a robot, a robotic voice effect may be applied to the speech.

The editing methods 40 in FIGS. 4A-4B are equally applicable to the above-mentioned variant of step 23 in FIG. 2 that produces the topics as individual words extracted from the text of the audio file A. One difference of this variant, compared to topics generated by topic segmentation, is that the time segments are much shorter, typically with an extent that matches the individual word. Thus, the background sound is added to effectively form an isolated sound effect at or slightly after the word in the audio file. For example, the word "explosion" in the text may cause the editing method 40 to suggest, or automatically incorporate, an explosion sound.

The editing method 40 in FIG. 4A or FIG. 4B may be further modified to apply a specific significance to the above-mentioned context that may be identified based on existing background sound in the audio file A. In one embodiment, the editing method 40 compares the context that is identified for a time segment in the audio file A with the one or more topics that are identified by the topic segmentation algorithm within this time segment. If the context and topic(s) are similar or belong to a common category, the editing method 40 may choose to retain and possibly enhance the existing background sound in the time segment, and thus refrain from adding background sound to the time segment. On the other hand, if the context and topic differ significantly, the editing method 40 may cause background sound to be added for the time segment (manually by steps 44-45 in FIG. 4A or automatically by step 45' in FIG. 4B), and the editing method 40 may also operate on the audio file A to suppress or eliminate the existing background sound within the time segment.

Embodiments of the invention may be implemented on a single computing device 1, e.g. as shown in FIG. 1, which is configured to execute the editing method 40 in FIG. 4A or FIG. 4B, based on characterization data that is either pre-generated and stored in memory 4 or generated on-demand by the computing device 1, e.g. by executing the preparatory processing 20 in FIG. 2. FIG. 5A illustrates a variant, in which the computing device 1 is configured to execute the editing method 40 according to FIG. 4A or FIG. 4B but without executing the preparatory processing 20 in FIG. 2. Instead, the computing device 1 is connected to a second computing device 1', e.g. a web server, which comprises a memory 4' that stores a dedicated computer program which, when executed by a processor 3', performs the preparatory processing 20. The computing device 1 is configured to transmit the audio file A for preparatory processing to the second computing device 1', which returns the corresponding characterization data, designated by [D]. In an example use case, a user may start an editing program on the computing device 1 to augment an audio file A. The editing program transmits the audio file A to the secondary computing device 1' and then receives the characterization data [D] from the secondary computing device 1'. During the editing process, the editing program acquires background sound B (automatically or selected by the user) that matches characterization data [D] and then the editing program generates and provides the augmented audio data A*. FIG. 5B illustrates another variant, in which the first computing device 1 merely serves the task of allowing the user to access an editing service which is provided by the second computing device 1'. Thus, in the embodiment of FIG. 5B, the second computing device 1' executes the editing method 40, including the preparatory processing 20. The editing service may be fully automated so as to automatically produce the augmented audio data A*. Alternatively, the editing service may interact with the user, via the first computing device 1, to allow the user to select the background sound B to be added.

Figure 6:
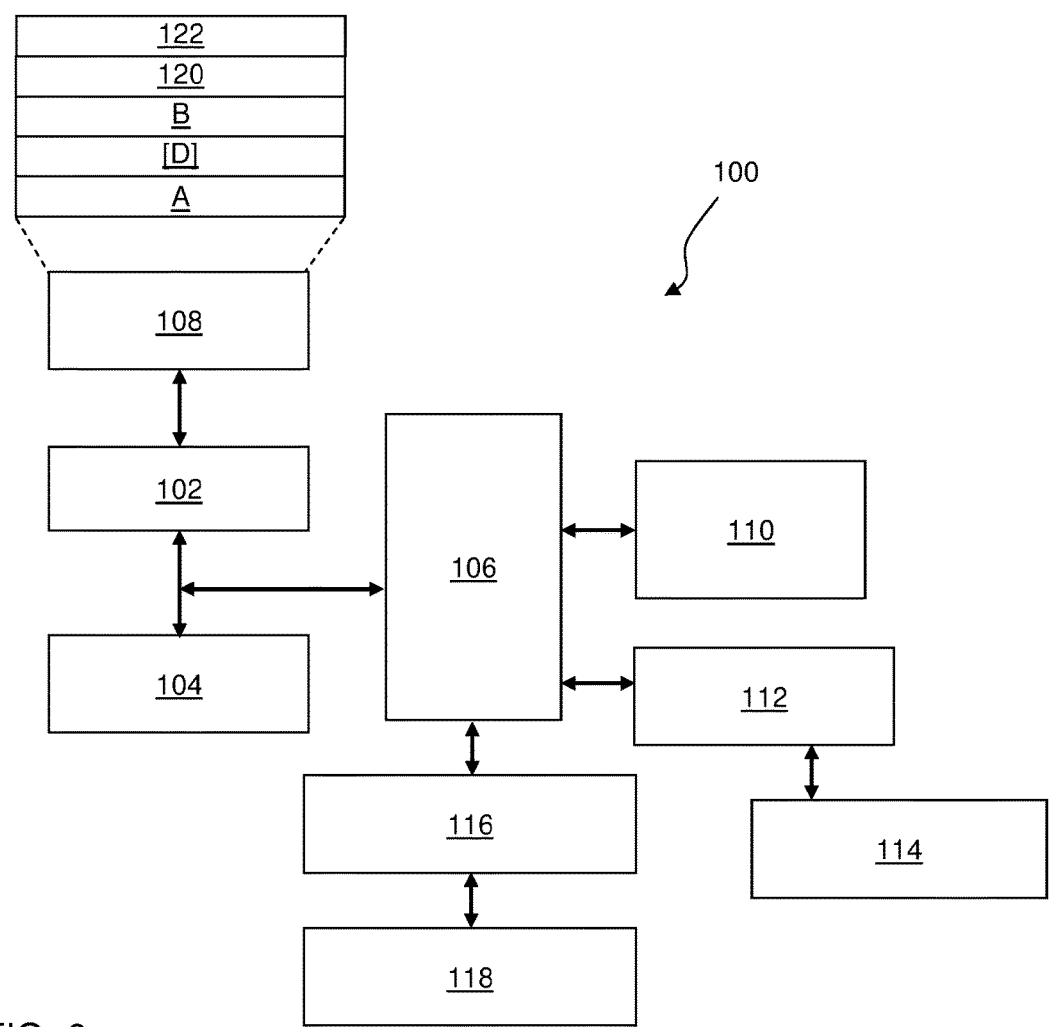
FIG. 6 is a block diagram of an example architecture for the computing device in FIG. 1.

FIG. 6 is a block diagram of an example architecture 100 for a computing device that executes the editing method 40. The following description is given with respect to the computing device 1 in FIG. 1, but it equally applicable to the computing devices 1, 1' in FIGS. 5A-5B. As shown, the computing device 1 may include a memory interface 102, one or more processors 104 such as data processors, image processors and/or central processing units, and a peripherals interface 106. The one or more processors 104 may correspond to or include the processor 3 in FIG. 1. The memory interface 102, one or more processors 104 and/or peripherals interface 106 may be separate components or integrated in one or more integrated circuits. The various components in the computing device 1 may be coupled by one or more communication buses or signal lines. Sensors, devices, and subsystems may be coupled to the peripherals interface 106 to facilitate multiple functionalities.

Communication functions may be facilitated through one or more wireless communication subsystems 110, which can include radio frequency receivers and transmitters and/or optical (e.g., infrared) receivers and transmitters. For example, the computing device 1 may include one or more communication subsystems 110 designed for wired and/or wireless communication over networks according to any network protocol. The specific design and implementation of the communication subsystem 110 may depend on the communication network(s) over which the computing device 1 is intended to operate. The communication subsystem(s) 110 may correspond to or be included in the data interface 2 in FIG. 1.

An audio subsystem 112 may be coupled to audio hardware component(s) 114, such as a loudspeaker and a microphone, to facilitate voice-enabled functions, such as voice recognition, voice replication, digital recording, and telephony functions, as well as to enable playback of audio files. The audio hardware component(s) 114 may correspond to or be included in the audio interface 5 in FIG. 1.

An I/O subsystem 116 may include one or more input/output controllers coupled to input/output hardware component(s) 118, including but not limited to one or more of a touch screen, a display, a keyboard, a key pad, a touch pad, a mouse, a thumb-wheel, an infrared port, a USB port, a pointer device such as a stylus, an eye tracker, and a camera. The I/O subsystem 116 may at least partly correspond to the data interface 2 in FIG. 1.

The memory interface 102 may be coupled to a memory 108, which may correspond to or include the memory 4 in FIG. 1. The memory 108 may include high-speed random access memory and/or non-volatile memory, such as one or more magnetic disk storage devices, one or more optical storage devices, and/or flash memory (e.g., NAND, NOR). The memory 108 may store an operating system. The operating system may include instructions for handling basic system services and for performing hardware dependent tasks. The memory 108 may also store communication instructions to facilitate communicating with one or more external devices, such as servers. The memory 108 may also include graphical user interface instructions to facilitate graphic user interface processing. In some embodiments, the memory 108 may also store one or more audio files A, as well as characterization data [D] for the respective audio file A. The memory 108 may also store background sound B, e.g. in the form of a plurality of sound files. The memory 108 may further store application programs which include any computer program executable by the processor(s) 104. In some embodiments, certain application programs may be installed on the computing device 1 by its manufacturer, while other application programs may be installed by a user. In the example of FIG. 6, one application program 120 may implement the editing method 40 for augmenting audio files. In the example of FIG. 6, another application program 122 implements the preparatory processing 20 and is invoked by the application program 120 when executing step 41 (FIGS. 4A-4B). In another example, the application program 120 implements the editing method 40 including the preparatory processing 20.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer readable medium for execution by, or to control the operation of, a data processing apparatus. The computer readable medium may be non-transitory, including a machine-readable storage device, a machine-readable storage substrate, a memory device, a composition of matter effecting a machine-readable propagated signal, or any combination thereof. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

For example, if the audio data is associated with images to be played in synchronization with the audio data, the preparatory processing 20 in FIG. 2 may be configured to also analyze the images to determine the topic and/or sentiment of time segments in the audio data. For example, the audio data may be included in or combined with a movie, a television transmission, a video game, or a keynote (slide show) presentation. The analysis of the images may supplement the analysis of the audio data, or even replace the latter, for the determination of the topics and/or sentiments.

The invention claimed is:

1. A method of augmenting speech-containing audio data on a computing device comprising a processor, said method being executed by the processor in the computing device and comprising:
   obtaining characterization data by processing the audio data using natural language processing to characterize time segments in the audio data by at least one of topic or sentiment, wherein obtaining characterization data comprises:
      generating text corresponding to the audio data by operating a speech recognition algorithm on the audio data,
      associating the text with time points in the audio data,
      operating a topic segmentation algorithm on the text to determine topics in the text on at least two different levels of granularity, wherein the topics comprise a main topic and a sub-topic, and each of the main topic and the sub-topic are determined for a respective text segment in the text, and
      generating the characterization data by determining time segments in the audio data corresponding to the text segments and generating an association between the time segments and topic identifiers representing the topics, wherein the time segments include a first time segment associated with the main topic and having a first length and a second time segment associated with the sub-topic and having a second length and the first time segment and the second time segment at least partially overlap in time,
   deriving, for a respective time segment in the audio data and based on the characterization data, a desired property of a background sound to be added to the audio data in the respective time segment,
   providing the desired property for the respective time segment so as to enable the audio data to be combined, within the respective time segment, with background sound having the desired property; and
   combining the audio data with the background sound to produce augmented audio data.

2. The method of claim 1, wherein the desired property is derived to match the topic and/or the sentiment of the respective time segment.

3. The method of claim 1, wherein the topic represents substance or theme of spoken language within the respective time segment in the audio data.

4. The method of claim 1, wherein the characterization data is at least partly generated by automated analysis of speech in the audio data.

5. The method of claim 1, wherein the sentiment represents emotion of spoken language within the respective time segment in the audio data and comprises one or more of: a positive sentiment, a negative sentiment, a neutral sentiment, anger, joy, sadness, surprise, accusation, fear, anxiety, unpleasantness, disgust, relief, desire, love, hate, calm, excitement and suspense.

6. The method of claim 1, wherein the desired property is derived at least partly based on the sentiment of the respective time segment and is indicative of one or more of: a playback volume of the background sound, a tempo of the background sound, a tonality of the background sound, and a mood of the background sound.

7. The method of claim 1, wherein the step of obtaining the characterization data further comprises: operating a sentiment analysis algorithm on the text to determine sentiments in the text, each sentiment being determined for a respective text segment in the text, said method further comprising generating the characterization data by determining time segments in the audio data corresponding to the text segments and generating an association between the time segments and sentiment identifiers representing the sentiments.

8. The method of claim 1, wherein the step of obtaining characterization data comprises processing the audio data for extraction of audio features, analyzing the audio features by an acoustic-based sentiment analysis algorithm for determination of a sentiment of speech in at least one time segment of the audio data, and generating an association between the at least one time segment and a sentiment identifier representing the sentiment.

9. The method of claim 1, wherein the audio data is associated with image data to be played in synchronization with the audio data, and wherein the step of obtaining characterization data comprises analyzing the image data for determination of topics and/or sentiments in the image data, and generating an association between time segments in the audio data and topic identifiers representing the topics and/or sentiment identifiers representing the sentiments.

10. The method of claim 1, further comprising: obtaining a context identifier that represents a context of existing background sound within a time segment in the audio data, and selectively determining if background sound is to be added to the time segment based on a comparison of the context identifier to one or more topics given by the characterization data for the time segment.

11. The method of claim 1, further comprising: displaying, on a display, a selection of options for deriving the desired property, receiving a user selection of one of the options, and deriving the desired property based on the user selection, wherein the selection of options comprises one or more of deriving the desired property based on topic only, deriving the desired property based on sentiment only and deriving the desired property based on topic and sentiment.

12. The method of claim 1, wherein the step of providing the desired property comprises: displaying, on a display, an option for allocating background sound to the respective time segment together with an indication of the desired property for the respective time segment, receiving a user selection of one or more sound files containing background sound for the respective time segment, and generating augmented audio data by combining the audio data within the respective time segment with the background sound in the one or more sound files.

13. The method of claim 1, further comprising: automatically obtaining background sound having the desired property of the respective time segment, and generating augmented audio data by combining the audio data within the respective time segment with the background sound.

14. The method of claim 13, wherein the step of automatically obtaining the background sound comprises at least one of: obtaining one or more sound files from a library of background sound and algorithmically generating the background sound.

15. A non-transitory computer-readable medium comprising computer instructions which, when executed by a processor, cause the processor to perform a method of augmenting speech-containing audio data comprising:
   obtaining characterization data by processing the audio data using natural language processing to characterize time segments in the audio data by literary category and at least one of topic or sentiment, wherein obtaining characterization data comprises:

generating text corresponding to the audio data by operating a speech recognition algorithm on the audio data, associating the text with time points in the audio data, operating a topic segmentation algorithm on the text to determine topics in the text on at least two different levels of granularity, wherein the topics comprise a main topic and a sub-topic, and each of the main topic and the sub-topic are determined for a respective text segment in the text, and generating the characterization data by determining time segments in the audio data corresponding to the text segments and generating an association between the time segments and topic identifiers representing the topics, wherein the time segments include a first time segment associated with the main topic and having a first length and a second time segment associated with the sub-topic and having a second length and the first time segment and the second time segment at least partially overlap in time, deriving, for a respective time segment in the audio data and based on the characterization data, a desired property of a background sound to be added to the audio data in the respective time segment, providing the desired property for the respective time segment so as to enable the audio data to be combined, within the respective time segment, with background sound having the desired property, and combining the audio data with the background sound to produce augmented audio data.

16. A computing device for augmenting speech-containing audio data, said computing device being configured to:

obtain characterization data by processing the audio data using natural language processing to characterize time segments in the audio data by at least one of topic or sentiment, wherein the computer device is configured to obtain the characterization data by:

generating text corresponding to the audio data by operating a speech recognition algorithm on the audio data, associating the text with time points in the audio data, operating a topic segmentation algorithm on the text to determine topics in the text on at least two different levels of granularity, wherein the topics comprise a main topic and a sub-topic, and each of the main topic and the sub-topic are determined for a respective text segment in the text, and generating the characterization data by determining time segments in the audio data corresponding to the text segments and generating an association between the time segments and topic identifiers representing the topics, wherein the time segments include a first time segment associated with the main topic and having a first length and a second time segment associated with the sub-topic and having a second length and the first time segment and the second time segment at least partially overlap in time, derive, for a respective time segment in the audio data and based on the characterization data, a desired property of a background sound to be added to the audio file in the respective time segment, provide the desired property for the respective time segment so as to enable the audio data to be combined, within the respective time segment, with background sound having the desired property, and combine the audio data with the background sound to produce augmented audio data.

\* \* \* \* \*